United States Patent

[11] 3,600,983

| [72] | Inventor | Robert B. Hendry<br>45833 Warm Springs Blvd., Fremont, Calif. 94538 |
|---|---|---|
| [21] | Appl. No. | 797,573 |
| [22] | Filed | Feb. 7, 1969 |
| [45] | Patented | Aug. 24, 1971 |

[54] CUTTING AND DEFORMING DEVICE FOR WIRE INSULATION
13 Claims, 8 Drawing Figs.

[52] U.S. Cl. ................................................... 81/9.5, 30/90.1
[51] Int. Cl. ........................................... H02g 1/12, B21f 13/00, B26h 27/00
[50] Field of Search .......................................... 81/9.5; 30/90.1, 90.4, 90.6, 90.7, 90.8, 91

[56] References Cited
UNITED STATES PATENTS

| 562,697 | 6/1896 | Rieckel | 81/9.5 |
| 1,866,095 | 7/1932 | Foley | 30/90.7 |
| 2,089,528 | 8/1937 | Barycz | 81/9.5 X |

*Primary Examiner*—Othell M. Simpson
*Attorney*—Gardner & Zimmerman

ABSTRACT: A cutting and deforming device for scoring or partially severing the outer insulation of wire or wire cables and for deforming the severed length of insulation along its length to enable the same to be removed from such wire. The device includes a pair of jaw elements movable relative to each other between open and closed positions and equipped with a plurality of cutting blades operative to cut such insulation upon closure of the jaw elements and angular displacement of the device and cutting blades relative thereto. The device is equipped with depth-limiting structure adjacent each cutting blade and engageable with the insulation to limit penetration of the blades thereinto; and it further includes an anvil and a deforming blade respective carried by the jaw elements and cooperative to deform a cut or severed length of insulation to facilitate removal thereof from the wire.

PATENTED AUG24 1971
3,600,983
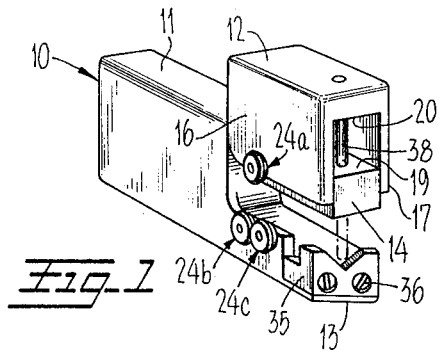
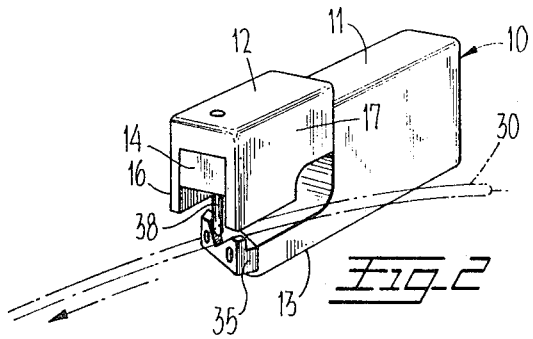
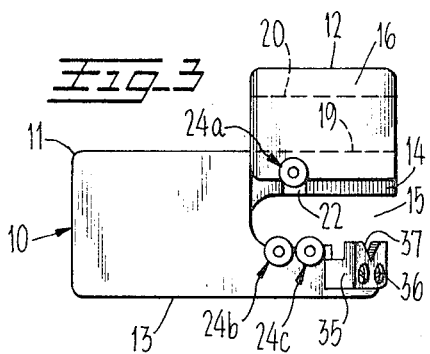
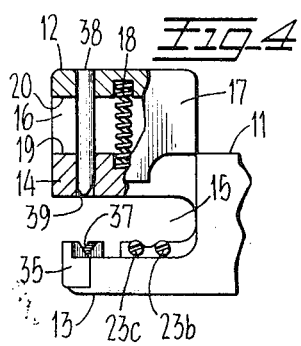
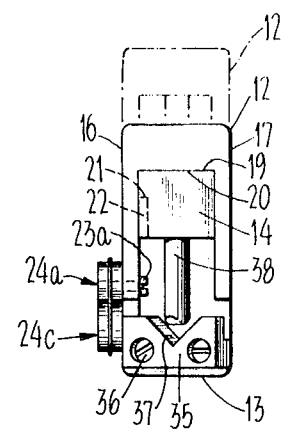
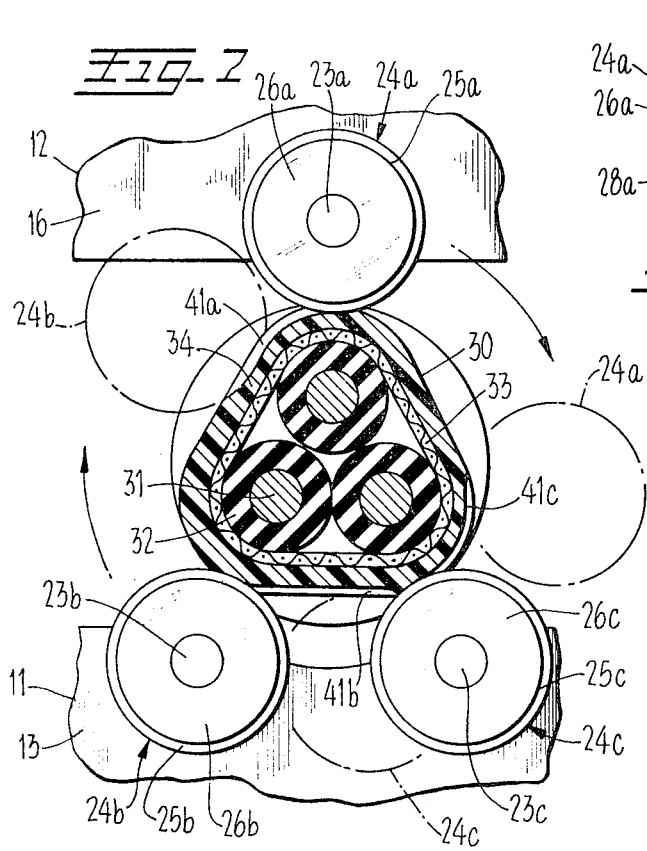
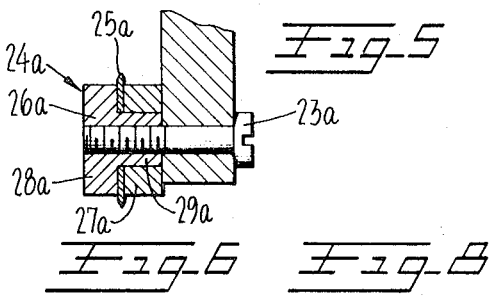
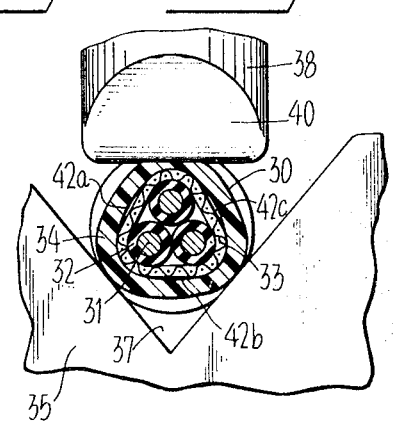
INVENTOR.
Robert B. Hendry
BY
Gardner & Zimmerman
ATTORNEYS

CUTTING AND DEFORMING DEVICE FOR WIRE INSULATION

This invention relates to a cutting and stripping device and, more particularly, to a cutting device for scoring or partially severing wire insulation and the like and for deforming the severed length of insulation to enable the same to be removed from the wire, all without inadvertent damage to the wire conductors or other elements located in underlying relation with the insulation.

Although the advent of printed and integrated circuitry has reduced the use of wire conductors in electronic equipment, there are still many environments and locations at which wire must be employed. In many such environments, the conductor array is complex and may include wire or wire cabling comprising several individual conductors, each of small diameter and insulated, confined within metal shielding which is encapsulated within an outer insulator, a polyurethane heat shield for example. Quite clearly, it is necessary to form various junctions and interconnections along such conductors, and this requires cutting the same to the proper length and stripping the insulation as necessary to expose the inner metal conductors. Since in many cases, the wire conductors are quite small and delicate, they are easily damaged, often without knowledge, unless great care is exercised; and unknown damage can cause shorting, fire, and at times can lead to great disaster, particularly in the environment of spacecraft and other aircraft.

Although a number of techniques and devices have been developed for stripping wire (both single-conductor and multiple-conductor) of its insulation, so far as is known no versatile cutting device is now available which can be used to cut wire insulation, and especially the outer insulation of multiple-conductor wire, without the possibility of inadvertent damage occurring to components located within the confines of the insulation; and it is accordingly an object, among others, of the present invention to provide an improved cutting device for scoring or partially cutting wire insulation and the like without causing any such damage. Another object of the invention is that of providing a deforming device for deforming a cut length of wire insulation to loosen the same from the components enclosed therewithin so as to facilitate separation and removal of such cut length of insulation.

Still another object of the invention is in the provision of an improved cutting and deforming device of the character described which is automatically operable without adjustment to accommodate insulation-equipped wire of different sizes so as to score the insulation in each instance without completely penetrating the same, thereby obviating the possible occurrence of damage to any components confined within the insulation, and so as to deform the scored or cut length of insulation to loosen the same from the components confined therewithin, thereby facilitating removal of the insulation therefrom. Additional objects and advantages of the invention, especially as concerns particular features and details thereof, will become apparent as the specification proceeds.

The structural embodiment of the present invention includes a pair of jaw elements interconnected for relative displacements between open and closed positions, and which jaw elements are equipped with a plurality of blades operative to engage and cut the outer insulation of an electric wire upon closing of the jaw elements and rotational displacement of the device with respect to such wire. The jaw elements are further equipped with deforming mechanism including an anvil carried by one such element and a deforming blade carried by the other and operative upon closing of the jaw elements to engage the outer insulation of an electric wire and deform a cut length thereof upon displacement of the device along such length of the wire. A depth-limiting structure is arranged with each blade so as to limit penetration thereof into the insulation by engagement therewith. As a result of such relationship, which utilizes the insulation itself as the means for limiting the penetration of the cutting blades thereinto, the device is able to accommodate automatically and without adjustment insulation-equipped wire of different sizes.

An embodiment of the invention is illustrated in the accompanying drawings, in which:

FIG. 1 is a perspective view of a deforming and cutting device embodying the invention, with the jaw elements in their open position;

FIG. 2 is a perspective view of the device with the jaw elements thereof in their closed position and the anvil and deforming blade in engagement with insulation-equipped wire shown in phantom lines;

FIG. 3 is an end elevational view illustrating one side of the device;

FIG. 4 is a broken elevational view partly in section showing the opposite side of the device;

FIG. 5 is a front view in elevation of the device with the jaw elements thereof closed, the open position of the jaw elements being shown by broken lines;

FIG. 6 is an enlarged, vertical sectional view illustrating the structural details of one of the cutting mechanisms;

FIG. 7 is a greatly enlarged, side view in elevation showing the cutting blades of the device in operative engagement with an insulation-equipped, multiple-conductor wire; and FIG. 8 is an end view in elevation, similar to that of FIG. 5 but on a somewhat enlarged scale, showing the anvil and deforming blade of the device in operative engagement with an insulation-equipped, multiple-conductor wire.

The specific embodiment of the cutting and deforming device shown in the drawings is approximately full-size in FIGS. 1 through 5, and is designated in its entirety with the numeral 10. The device 10 includes a pair of jaw elements 11 and 12 supported for relative movement between open and closed positions. In this respect, the jaw element 11 has a generally U-shaped configuration adjacent one end portion thereof, as shown most clearly in FIGS. 3 and 4, and is provided thereat with a pair of spaced apart legs 13 and 14 disposed in parallel relation and defining a jaw opening or open area 15 therebetween. The leg 14 is somewhat smaller in width than the leg 13 (as indicated in FIG. 5) and is slidably receivable between the spaced apart legs 16 and 17 of the jaw element 12. Evidently then, the jaw element 12 is slidably reciprocable with respect to the jaw element 11 between the lower closed position shown by full lines in FIG. 5 and the upper open position shown by broken lines in such Figure.

The jaw elements 11 and 12 are resiliently biased into their open position by a helical compression spring 18 that is located within the space defined between the legs 16 and 17 of the jaw element 12 and respectively seats at the opposite ends thereof in recesses provided for this purpose in the facing surfaces 19 and 20 of the jaw elements, as illustrated in FIG. 4. Stop structure is provided to define the maximum closed and open positions of the jaw elements 11 and 12, and the maximum closed position thereof is established by abutment of the facing surfaces 19 and 20 as shown in both FIGS. 2 and 5. The stop structure establishing the maximum open position of the jaw elements as enforced thereon by the spring 18 includes the upper closed end 21 of a slot or channel 22 formed along one side of the leg 14 (see FIGS. 3 and 5) and the head of a screw 23 that secures a cutting mechanism 24a along the outer surface of the leg 16 of the jaw element 12, and which head of the screw 23 is slidable through the channel 22 and abuts the closed end 21 thereof when the jaw elements are in their open position.

A plurality of cutting mechanisms 24 are provided, and each includes both a cutting blade operative to score or cut the outer insulation provided by an electric wire or wire cable and a depth-limiting structure engageable with such insulation for limiting penetration of the blade thereinto. In the particular device 10 illustrated, three such mechanisms are provided in spaced apart relation so as to define a cutting station adapted to receive insulation-equipped wire therein. The jaw element 12 has the aforementioned mechanism 24a mounted thereon, and the jaw element 11 has two such mechanisms respectively designated with the numerals 24b and 24c.

The mechanisms are all identical and each comprises a cutting blade 25 (the letter suffixes being used where appropriate in the drawings to identify the components respectively associated with the various mechanisms 24a, 24b and 24c) which is cylindrical in configuration and, more especially, is a ring-shaped annulus defining a relatively large opening through the center thereof as shown in FIG. 6. The depth-limiting structure associated with any blade 25 is designated with the numeral 26, and is formed in two parts comprising an inner ring-shaped washer or spacer 27 having a center opening approximating in diameter that of the blade 25, and an outer nut 28 having a central hub or collar 29 extending through the opening in the blade 25 and into the opening in the spacer 27. The aggregate thickness or width of the spacer 27 and blade 25 is somewhat greater than that of the hub 29 so that tightening a fastener in the form of the threaded screw 23 projecting through an opening provided therefor in the associated jaw element is threadedly received within the nut 28 and fixedly constrains the blade 25 between the nut and spacer.

Accordingly, each mechanism 24 has a blade 25 that extends radially outwardly from the cylindrical surface of the associated depth-limiting structure 26 to provide a cylindrical or circumferential cutting edge of predetermined extent. It will be appreciated that the depth to which each blade 25 can penetrate the outer insulation forming a part of an electric wire or wire cable is determined by the extent to which the blade projects outwardly from the cylindrical surface of the associated depth-limiting structure because such surface is adapted to engage the insulation and thereby positively limit penetration by abutment therewith. In the particular device 10, each blade 25 projects outwardly a distance of about 0.005 of an inch from the surface of the depth-limiting structure. Since the blades 25 are fixedly constrained against movement during use of the device, one particular area of each blade will engage the insulation and perform the severance or scoring thereof. As such particular blade area becomes dull, the screw 23 of each mechanism can be loosened slightly and the blade 25 thereof displaced angularly to present another area for use at the cutting station. The blades 25 are in substantial alignment, and the stop defined by the facing abutment surfaces 19 and 20 maintains the blades in spaced apart relation for protection thereof should the jaw elements 11 and 12 be completely closed with no wire located at the cutting station.

The device 10 can be used with a great variety of electric wires or wire cables, and a particular instance thereof is the rather complex wire 30 illustrated in FIGS. 2, 7 and 8. Such wire 30 includes a plurality of individual current-carrying metallic conductors 31 (there being three in the wire 30) each of which is enclosed within an electric insulating sheath or cover 32. Surrounding the three conductors 31 is a metallic shield 33 in the form of braided metal strands which usually has for its function the electromagnetic isolation of the conductors 31. Surrounding the magnetic shield 33 is a layer of insulation 34 which in many instances is a thermal shield or high temperature insulator such as polyurethane. Such wires 30 are well known in the electronics industry and are not per se germane to the present invention. Accordingly, the wire 30 may be taken to be conventional with the outer layer of insulation 34 being thermal insulation to protect the inner conductors from a high temperature environment. It might be observed, however, that such insulation 34 is usually somewhat hard and may be twisted so that it appears to have a plurality of helically disposed ridges and grooves extending therealong which makes cutting thereof somewhat more difficult.

The device 10 as respects the deformation imparted thereby to the outer insulation 34 of a wire 30 includes an anvil 35 secured by a plurality of screws 36 to the leg 13 of the jaw element 11 which is angularly disposed along the outer forward end thereof so as to orient the anvil 35 at an angular disposition. The anvil 35 is provided centrally with a V-shaped recess 37 adapted to seat such wire 30 therein, as shown most clearly in FIG. 8. Cooperative with the anvil 35 is a deforming blade 38 in the form of a pin or post fixedly secured to the jaw element 12 and extending downwardly therefrom through an opening 39 provided therefor in the leg 14 of the jaw element 11, as is seen most clearly in FIG. 4. Evidently, the deforming blade 38 is reciprocable through the opening 39 and is movable with the jaw 12 between the open and closed positions respectively shown in FIGS. 4 and 5. It is seen that at its lower end the deforming blade 38 is tapered to a restricted cross section (as indicated at 40) to reduce the surface area thereof in engagement with a wire 30 during use of the deforming blade. Thus, the blade 38 has a somewhat V-shaped or knife-shaped lower end which, it may be observed in FIG. 5, is spaced from the anvil 35 when the jaw elements are in their closed position and no wire is seated within the recess 37.

To use the device 10, a wire 30 is positioned within the cutting station defined between the spaced apart mechanisms 24, and such insertion of the wire is readily accomplished since the jaw elements 11 and 12 are biased into their open position by the spring 18. After the wire 30 is so positioned, the jaw elements 11 and 12 are closed to bring the blades 25 into engagement with the outer insulation 34 as shown in FIG. 7. The device 10 is next rotated or displaced angularly relative to the wire 30 which causes each of the blades 25 to penetrate and partially cut or score the insulation 34, as shown by the score lines or lines of severance 41a, 41b and 41c in FIG. 7. Since three blades 25 are employed, it is not necessary that the device 10 be displaced through a complete 360° rotation in order to completely score the insulation 34; and when scoring thereof has been completed, the jaws 11 and 12 are released to enable the spring 18 to return the jaws to their open position.

The wire 30 is then seated within the recess 37 of the anvil 35 with the score lines or severance in substantial alignment with the deforming blade 38 and the jaw elements are closed to cause the blade 38 to press the wire against the anvil 35, as shown in FIG. 8. The compressive force thus applied to the outer insulation 34 deforms the same and causes it to separate from the metal shield 33, such as is shown in FIG. 8 at the areas 42a, 42b and 42c. Next, the wire 30 is drawn through the recess 37 while the deforming blade 38 is pressing against the wire so as to deform the outer insulation 34 along the entire length thereof which is to be stripped from the wire. After the wire has been drawn between the anvil 35 and deforming blade 37, the jaw elements 11 and 12 are released so as to permit them to return to their open position; and it has been found that the severed and deformed length of insulation 34 is readily removed from the wire 30 by simply sliding it therealong.

The lower end 40 of the deforming blade 38 is quite blunt so that it does not tend to cut through the insulation 34 of the wire 30 and since the area of the blade in engagement with the insulation is restricted, it is not exceedingly difficult to pull the wire between the anvil and blade while a significant manual compressive force is applied thereto by pressing the jaw elements 11 and 12 toward their fully closed position between the thumb and fingers of a hand. Respecting severance of the length of insulation effected by the blades 24, it is evident (as shown in FIG. 7) that the depth-limiting structures 26 bear against the outer surface of the insulation 34 and thereby positively limit the depth to which the blades 25 can penetrate the insulation. Therefore, the device 10 is automatically able to accommodate electric wires of different size, within the design limits of the device, to score the outer insulation thereof wholly without adjustment of the device, simply by closing the blades 25 into engagement with the insulation 34 of any such wire.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What I claim is:

1. A device for cutting wire insulation or the like to enable a length thereof to be stripped from the components enclosed therewithin and for deforming such length of insulation to facilitate such stripping thereof, comprising a pair of jaw elements interconnected one with the other for selective movement between open and closed positions, a cutting blade carried by one of said jaw elements for movement therewith between such open and closed positions and being effective in the closed position of said jaw elements to cut such insulation upon movement relative thereto of said device and the cutting blade thereof, and an anvil and a deforming blade respectively carried by said jaw elements for movement therewith between such open and closed positions and being effective in the closed position of said jaw elements to press against and deform such insulation upon longitudinal movement relative thereto of said device and the anvil and deforming blade thereof.

2. The device of claim 1 and further comprising depth-limiting structure engageable with such insulation for limiting penetration of said cutting blade thereinto, whereby said device is automatically operative without adjustment to accommodate insulation-equipped wire of different sizes to cut the insulation thereof without inadvertent damage to components therewithin.

3. The device of claim 1 in which a plurality of said cutting blades are provided at least one of which is carried by each of said jaw elements.

4. The device of claim 3 in which at least three spaced apart cutting blades are provided and are adapted to have such insulation-equipped wire disposed therebetween for respective cutting engagement with the insulation thereof, said device being angularly movable with respect to such insulation-equipped wire to effect such cutting of the insulation thereof.

5. The device of claim 4 and further comprising depth-limiting structure engageable with such insulation for limiting penetration of said cutting blade thereinto, whereby said device is automatically operative without adjustment to accommodate insulation-equipped wire of different sizes to cut the insulation thereof without inadvertent damage to components therewithin.

6. The device of claim 5 in which said depth-limiting structure comprises a plurality of cylindrical components respectively associated with said cutting blades in close proximity therewith, and in which each of said cutting blades is cylindrical and projects outwardly from the circumferential surface of the associated depth-limiting component.

7. The device of claim 6 in which said anvil has a recess adapted to seat insulation-equipped wire therein, and in which said deforming blade is displaceable into said recess upon closing of said jaw elements.

8. The device of claim 7 in which said recess is generally V-shaped, and in which said deforming blade tapers to a restricted cross section engageable with such insulation.

9. The device of claim 8 and further comprising spring structure resiliently biasing said jaw elements toward the open position thereof, and in which stops are provided that define the maximum open and closed positions of said jaw elements.

10. The device of claim 1 in which said anvil has a recess adapted to seat insulation-equipped wire therein, and in which said deforming blade is displaceable into said recess upon closing of said jaw elements.

11. The device of claim 10 and further comprising depth-limiting structure engageable with such insulation for limiting penetration of said cutting blade thereinto, whereby said device is automatically operative without adjustment to accommodate insulation-equipped wire of different sizes to cut the insulation thereof without inadvertent damage to components therewithin, and in which at least three spaced apart cutting blades are provided at least one of which is carried by each of said jaw elements, said cutting blades being adapted to have such insulation-equipped wire disposed therebetween for respective cutting engagement with the insulation thereof, said device being angularly movable with respect to such insulation-equipped wire to effect such cutting of the insulation thereof.

12. The device of claim 11 in which said recess is generally V-shaped, and in which said deforming blade tapers to a restricted cross section engageable with such insulation.

13. The device of claim 12 and further comprising spring structure resiliently biasing said jaw elements toward the open position thereof, and in which stops are provided that define the maximum open and closed positions of said jaw elements.